United States Patent
Ito

(10) Patent No.: US 11,126,715 B2
(45) Date of Patent: Sep. 21, 2021

(54) SIGNATURE GENERATION DEVICE, SIGNATURE GENERATION METHOD, RECORDING MEDIUM STORING SIGNATURE GENERATION PROGRAM, AND SOFTWARE DETERMINATION SYSTEM

(71) Applicant: NEC CORPORATION, Tokyo (JP)

(72) Inventor: Tatsuya Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 16/320,677

(22) PCT Filed: Jul. 21, 2017

(86) PCT No.: PCT/JP2017/026382
§ 371 (c)(1),
(2) Date: Jan. 25, 2019

(87) PCT Pub. No.: WO2018/021163
PCT Pub. Date: Feb. 1, 2018

(65) Prior Publication Data
US 2019/0163906 A1 May 30, 2019

(30) Foreign Application Priority Data
Jul. 27, 2016 (JP) .............................. JP2016-147473

(51) Int. Cl.
*G06F 21/56* (2013.01)
*G06F 21/60* (2013.01)
(Continued)

(52) U.S. Cl.
CPC ............ *G06F 21/564* (2013.01); *G06F 21/00* (2013.01); *G06F 21/12* (2013.01); *G06F 21/567* (2013.01);
(Continued)

(58) Field of Classification Search
CPC ................. G06F 21/564; G06F 21/567; G06F 2221/033; G06F 21/60; G06F 21/12;
(Continued)

(56) References Cited

U.S. PATENT DOCUMENTS

| 2008/0127336 A1 | 5/2008 | Sun et al. |
| 2012/0192273 A1 | 7/2012 | Turbin et al. |
| 2017/0310694 A1* | 10/2017 | Kamiya .................. G06F 21/56 |

FOREIGN PATENT DOCUMENTS

| JP | 2012-3463 A | 1/2012 |
| JP | 2013-529335 A | 7/2013 |
| WO | 2016/080232 A1 | 5/2016 |

OTHER PUBLICATIONS

Machine translation of Miyake et al. JP Publication 2012003463 (Year: 2012).*

(Continued)

*Primary Examiner* — Jung W Kim
*Assistant Examiner* — Howard H. Louie
(74) *Attorney, Agent, or Firm* — Sughrue Mion, PLLC

(57) ABSTRACT

Provided is a signature generation device, etc., generating signature information with high accuracy. The signature generation device calculates hash values for at least a partial area in individual files; calculates a similarity degree between the calculated hash values and classifies the plurality of files into groups based on the calculated degree; specifies common strings among, at least, some of the files in strings included in files of a group, the strings being symbol strings or bit strings; and generates signature information being a criterion for determining whether or not at least a part of the common string in the specified common strings is included.

9 Claims, 13 Drawing Sheets

(51) Int. Cl.
   *G06F 21/12*     (2013.01)
   *G06F 21/00*     (2013.01)
   *H04L 29/06*     (2006.01)

(52) U.S. Cl.
   CPC ........ *G06F 21/60* (2013.01); *H04L 29/06911*
           (2013.01); *H04L 63/14* (2013.01); *H04L*
           *63/145* (2013.01); *H04L 63/1441* (2013.01);
                               *G06F 2221/033* (2013.01)

(58) Field of Classification Search
   CPC .... G06F 21/00; H04L 29/06911; H04L 63/14;
                       H04L 63/1441; H04L 63/145
   See application file for complete search history.

(56) References Cited

OTHER PUBLICATIONS

Office Action dated Oct. 25, 2019, issued by the Federal Service on Intellectual Property of Russia in counterpart application No. 2019105303/08.
International Search Report for PCT/JP2017/026382 dated Oct. 10, 2017 [PCT/ISA/210].
Written Opinion for PCT/JP2017/026382 dated Oct. 10, 2017 [PCT/ISA/237].

\* cited by examiner

Fig.3

| SIGNATURE INFORMATION | |
|---|---|
| STRING INFORMATION | |
| IDENTIFIER | STRING |
| A | RequireAdministrator |
| B | LookupPrivilegeValueA |
| C | {01 01 01 10 01} |
| D | ZZZZZZZZ |

| DETERMINATION INFORMATION | A and B and (C or D) |
|---|---|

SIGNATURE GENERATION DEVICE, SIGNATURE GENERATION METHOD, RECORDING MEDIUM STORING SIGNATURE GENERATION PROGRAM, AND SOFTWARE DETERMINATION SYSTEM

CROSS REFERENCE TO RELATED APPLICATIONS

This application is a National Stage of International Application No. PCT/JP2017/026382, filed on Jul. 21, 2017, which claims priority from Japanese Patent Application No. 2016-147473, filed on Jul. 27, 2016, the disclosures of which are incorporated herein in their entirety.

TECHNICAL FIELD

The present invention relates to a signature generation device and the like that generates signature information including a criterion for determining whether or not a file includes a software adversely affecting an information processing system.

BACKGROUND ART

PTL 1 discloses a signature generation device that generates signature information that represents a criterion for determining whether a history of processing executed by software matches a history of processing executed by malware. The signature generation device traces processing executed by malware and collects a trace log that represents a history of processing executed by the malware. Next, the signature generation device classifies malware that has executed processing included in the trace log into a malware family, based on whether processing included in the trace log is similar to one another. One malware family is a group of malware having trace logs resembling each other. The signature generation device specifies a series of processing that is common among a malware family, and generates signature information, based on the specified series of processing.

PTL 2 discloses a signature generation device. The signature generation device specifies a text string that frequently appears in a sequence of processing as signature information when a sample is a sequence of processing expressed in a text format. The sample is a target for determining whether or not to be malware.

CITATION LIST

Patent Literature

PTL 1: Japanese Translation of PCT International Application Publication No. 2013-529335
PTL 2: Japanese Unexamined Patent Application Publication No. 2012-003463

SUMMARY OF INVENTION

Technical Problem

However, even the signature generation device disclosed in either PTL 1 or PTL 2 have a difficulty in generating highly accurate signature information within a short period of time. This is because generation of highly accurate signature information takes a long period of time. Specifically, the signature generation device disclosed in PTL 1 requires a computing environment (for example, a sandbox) for tracing a series of processing executed by malware and time for tracing the series of processing. Thus, the signature generation device disclosed in PTL 1 requires a long period of time to generate signature information. Furthermore, text strings for individual malware are not always common among a plurality of kinds of malware. In such a case, the signature generation device disclosed in PTL 2 cannot necessarily generate highly accurate signature information.

As such, one object of the present invention is to provide a signature generation device and the like that can generate highly accurate signature information within a short period of time.

Solution to Problem

As an aspect of the present invention, a signature generation device including:

hash calculation means for calculating hash values for at least a partial area in individual files;

classification means for calculating a similarity degree between the hash values calculated by the hash calculation means and classifying the plurality of files into groups based on the calculated degree;

specification means for specifying common strings among, at least, some of the files in strings included in files of a group, the strings being symbol strings or bit strings; and signature generation means for generating signature information being a criterion for determining whether or not at least a part of the common string in the specified common strings is included.

In addition, as another aspect of the present invention, a signature generation method including:

calculating hash values for at least a partial area in individual files;

calculating a similarity degree between the calculated hash values and classifying the plurality of files into groups based on the calculated degree;

specifying common strings among, at least, some of the files in strings included in files of a group, the strings being symbol strings or bit strings; and generating signature information being a criterion for determining whether or not at least a part of the common string in the specified common strings is included.

In addition, as another aspect of the present invention, a signature generation program making a computer achieve:

a hash calculation function for calculating hash values for at least a partial area in individual files;

a classification function for calculating a similarity degree between the hash values calculated by the hash calculation function and classifying the plurality of files into groups based on the calculated degree;

a specification function for specifying common strings among, at least, some of the files in strings included in files of a group, the strings being symbol strings or bit strings; and a signature generation function for generating signature information being a criterion for determining whether or not at least a part of the common string in the specified common strings is included.

Furthermore, the object is also achieved by a computer-readable recording medium that records the program.

Advantageous Effects of Invention

According to the signature generation device and the like of the present invention, highly accurate signature information can be generated within a short period of time.

BRIEF DESCRIPTION OF DRAWINGS

FIG. 3 is a diagram conceptually illustrating an example of signature information.

EXAMPLE EMBODIMENT

In the following, example embodiments of the present invention will be described in detail with reference to the drawings.

First Example Embodiment

Figure 1:
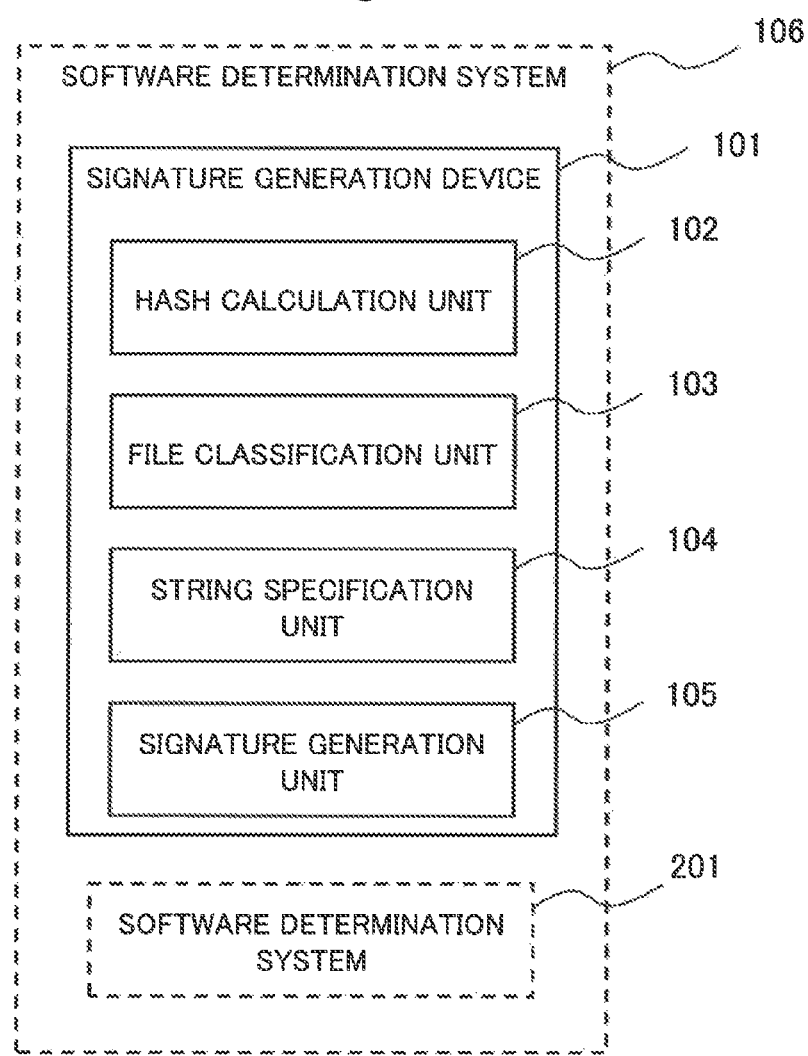
FIG. 1 is a block diagram illustrating a configuration of a software determination system including a signature generation device according to a first example embodiment of the present invention.

With reference to FIG. 1, a configuration of a signature generation device 101 according to a first example embodiment of the present invention will be described in detail. FIG. 1 is a block diagram illustrating a configuration of a software determination system 106 including the signature generation device 101 according to the first example embodiment of the present invention.

The signature generation device 101 according to the first example embodiment includes a hash calculation unit (hash calculator) 102, a file classification unit (file classifier) 103, a string specification unit (string specifier) 104 and a signature generation unit (signature generator) 105. The software determination system 106 includes the signature generation device 101 and a software determination device 201.

The signature generation device 101 inputs a plurality of data files (hereinafter, a "data file" is referred to as a "file") and generates signature information (as will be described later with reference to FIG. 3) that is a criterion for determining whether the input files include software that adversely affects an information processing system (i.e., malware, hereinafter, referred to as a "bad-ware"), based on the input plurality of files. The signature generation device 101 may receive the plurality of files through a communication network, instead of inputting the plurality of files.

For convenience of explanation, in the first example embodiment, it is assumed that the files input in the signature generation device 101 include bad-ware.

The software determination device 201 determines whether or not a file includes bad-ware, for example, depending on a determination result of the file in accordance with the signature information generated by the signature generation device 101. The software determination device 201 may determine whether or not the file includes bad-ware, in accordance with signature information generated by a device other than the signature generation device 101.

In the following description, it is assumed that software adversely affects an information processing system and processing of a signature generation device according to each example embodiment of the present invention will be described. However, the software may instead be a sequence of processing that includes one or more pieces of processing.

Figure 2:
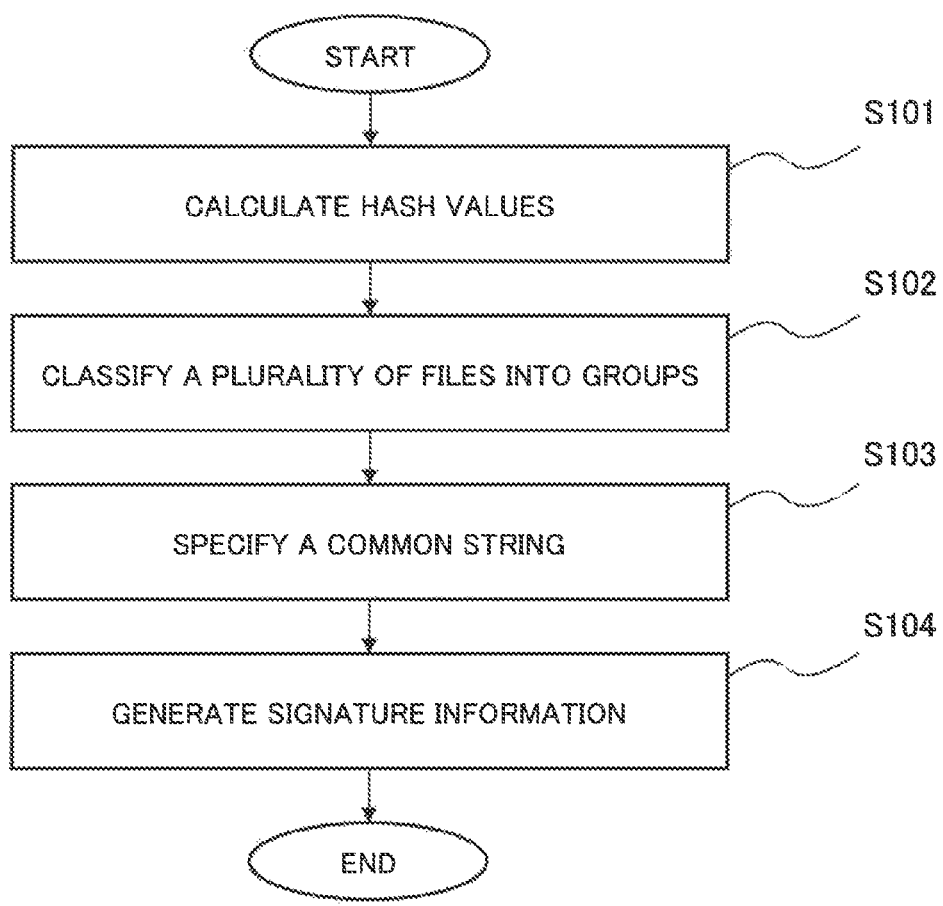
FIG. 2 is a flowchart illustrating a processing flow of the signature generation device according to the first example embodiment.

Next, with reference to FIG. 2, processing of the signature generation device 101 according to the first example embodiment of the present invention will be described in detail. FIG. 2 is a flowchart illustrating a processing flow of the signature generation device 101 according to the first example embodiment.

In the signature generation device 101, the hash calculation unit 102 calculates a hash value relating to each file of the input plurality of files in accordance with a predetermined hash calculation procedure to be described later (step S101). The hash calculation unit 102 calculates a hash value relating to a file by executing processing for calculating a hash value for at least a part of data included in the file in accordance with the predetermined hash calculation procedure. The hash calculation unit 102 may calculate a hash value for a partial area (data, segment, field) included in a file, or may calculate a hash value for a whole area (data) of the file. As described in a second example embodiment, the hash calculation unit 102 may select an area of a file (data) as a target for calculating a hash value, for example, depending on a type (a format) of the file.

The predetermined hash calculation procedure is, for example, Fuzzy Hashing that calculates similar hash values for data resembling each other. The predetermined hash calculation procedure is not limited to Fuzzy Hashing. It is assumed that the hash calculation unit 102 calculates a hash value for convenience of explanation. However, the hash value may be information, such as a symbol string with a data size smaller than calculation target data or a numeric string, without limitation to a general hash value.

Next, the file classification unit 103 classifies a plurality of files into a plurality of groups, based on a similarity degree between hash values calculated for individual files (that is, similarity between hash values) (step S102). The file classification unit 103 classifies a plurality of files into a plurality of groups, for example, in accordance with a predetermined clustering procedure. When a plurality of files are classified into a plurality of groups, there may be or may not be a file that is commonly included in a plurality of groups. The predetermined clustering procedure may be a non-hierarchical clustering method, such as k-means method, or a hierarchical clustering method, such as Ward method. As a non-hierarchical clustering method and a hierarchical clustering method are general methods, the descriptions thereof will be omitted in the present example embodiment.

Next, the string specification unit 104 specifies a string that is commonly included in at least some of files among symbol strings or bit strings (hereinafter, a symbol string or a bit string is collectively referred to as a "string") included in a plurality of files in a group (step S103). For convenience of explanation, a commonly included string is referred to as a "common string." The string specification unit 104 may execute the processing indicated in step S103 for each group.

For example, the string specification unit 104 may specify a common string with relatively high appearance among files in a group as the above-described common string. For example, when the frequency of appearance of a string that is commonly included in files in a group is higher than a predetermined threshold, the string specification unit 104 may specify the relatively high appearance string as a common string. As described above, in the present example embodiment, since the input files include bad-ware, a string included in the bad-ware is likely to be specified by specifying a string with frequent appearance.

Next, the signature generation unit 105 generates signature information (as will be described with reference to FIG. 3) that is a criterion for determining whether or not at least a part of the common string specified by the string specification unit 104 is included (step S104). In other words, the signature information represents a criterion for determining whether or not a file includes bad-ware. The signature generation unit 105 generates a Boolean formula that is generated by combining some criterions for determining whether or not a common string is included with a logical AND (or logical OR) operator, as determination information of the signature information. The method of calculating signature information based on a common string may be any method that generates determination information representing a determination criterion based on a string commonly included in a plurality of files in a group, without limitation to the above example.

With reference to FIG. 3, the signature information will be described. FIG. 3 is a diagram conceptually illustrating an example of signature information.

The signature information includes string information that represents a common string specified at step S103 of FIG. 2 and determination information that represents a determination criterion for determining whether or not a file includes bad-ware.

In the string information, an identifier that can uniquely identify the common string is associated with information representing a content of the common string. The string information represents a criterion where a file includes a common string identified by an identifier. The signature information exemplified in FIG. 3 includes string information where the identifier "A" is associated with a string "RequireAdministrator." This indicates a criterion where a string identified by an identifier "A" is "RequireAdministrator" (that is, requiring authorization for a system) and a file includes the string "RequireAdministrator." Further, the signature information exemplified in FIG. 3 includes an identifier "C" and a string "{01 01 01 10 01}." This indicates a criterion where a string identified by an identifier "C" is "{01 01 01 10 01}" and a file includes the string "{01 01 01 10 01}." In FIG. 3, "{ }" indicates a bit string.

The signature information exemplified in FIG. 3 includes determination information "A and B and (C or D)." Here, "and" indicates a logical AND operator and "or" indicates a logical OR operator. "( )" indicates that an operation in the parentheses precedes. The determination information represents a criterion that is satisfied, when a criterion identified by the identifier "C" is satisfied or a criterion identified by the identifier "D" is satisfied, and further, when a criterion identified by the identifier "A" and a criterion identified by the identifier "B" are satisfied. That is, the signature information represents a criterion for determining that the file includes bad-ware, when criterions indicated by the following criterions 1 to 3 are satisfied with regard to a file:

Criterion 1: a string "{01 01 01 10 01}" is included or a string "ZZZZZZZZZ" is included;

Criterion 2: a string "LookupPrivilegeValueA" (that is, acquiring an identifier corresponding to authorization) is included; and Criterion 3: a string "RequireAdministrator" is included.

The following will describe an advantageous effect of the signature generation device 101 according to the first example embodiment.

The signature generation device 101 can generate highly accurate signature information within a short period of time. This is because it is not necessary to trace software behavior in order to generate signature information and signature information is generated based on a common string among a plurality of files at least parts of which contents resembles one another. The following will describe this reason in more details.

Files including similar constituents may include specific processing that is executed in accordance with the constituents. In such a case, specification of a string common in the similar constituents can achieve highly accurate signature information that represents a criterion for determining whether or not a file includes the specific processing.

The signature generation device disclosed in PTL 2 generates signature information that represents a criterion for determining whether or not files include specific processing without discriminating similarity among contents of constituents included in the files. Thus, the signature generation device generates signature information that represents a determination criterion of whether or not the file includes specific processing even when the contents of the constituents are not similar. In such a case, since the signature information generated by the signature generation device is likely to be generated based on noise included in files, the signature information may not necessarily have high accuracy. The noise refers to a string irrelevant to specific processing.

On the contrary, the signature generation device 101 according to the present example embodiment specifies a string common among similar constituents. Therefore, the common string is likely to represent specific processing executed in accordance with the constituents resembling one another.

Further, the signature generation device disclosed in PTL 1 generates signature information for determining whether or not software executes specific behavior, based on a trace log representing behavior of the processing executed in accordance with the software. On the contrary, the signature generation device 101 according to the present example embodiment does not refer to the trace log in generating signature information. Behavior investigation of processing of software requires execution environment, such as a sandbox, and time for tracing software behavior in the execution environment. Since processing of tracing software behavior generally costs a long time, the signature generation device disclosed in PTL 1 cannot generate highly accurate signature information within a short period of time.

On the contrary, since the signature generation device 101 according to the present example embodiment generates signature information that represents a criterion for whether or not specific processing is included based on a string included in software, time for tracing software behavior is unnecessary. As such, the signature generation device 101 according to the present example embodiment can generate the signature information within a shorter period of time compared with that of the signature generation device disclosed in PTL 2.

Thus, the signature generation device 101 according to the present example embodiment can generate highly accurate signature information within a short period of time.

Second Example Embodiment

The following will describe a second example embodiment of the present invention on the basis of the above-described first example embodiment.

The following description will mainly describe a characteristic configuration according to the present example embodiment. The same components as those of the above-described first example embodiment will be denoted by the same reference numerals to omit redundant descriptions.

Figure 4:
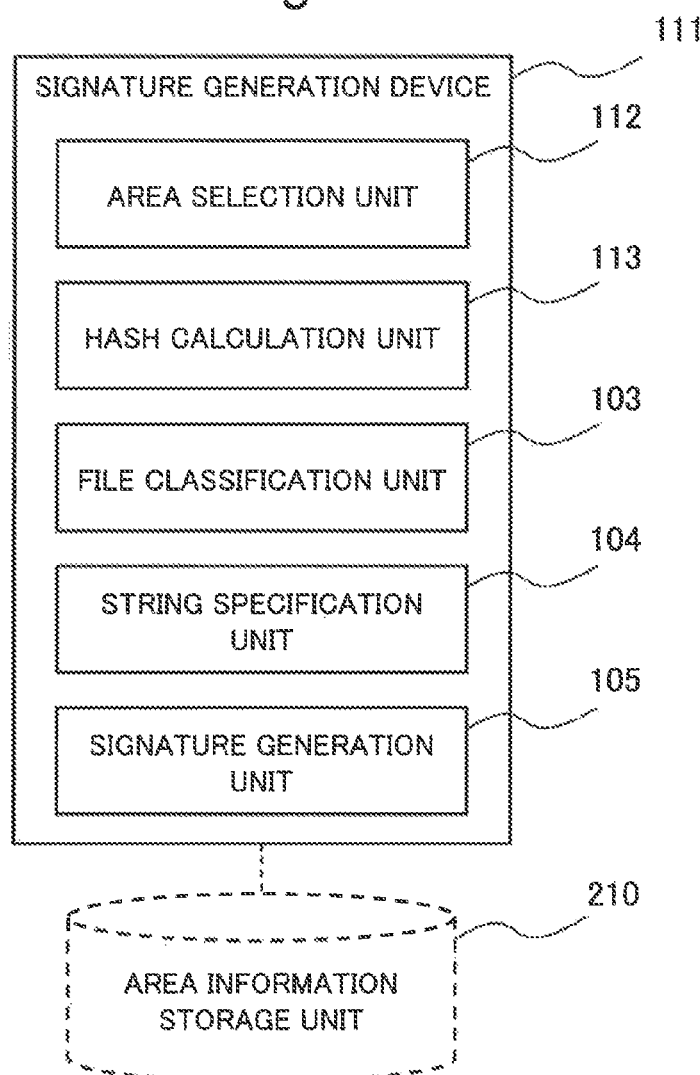
FIG. 4 is a block diagram illustrating a configuration of a signature generation device according to a second example embodiment of the present invention.

With reference to FIG. 4, a configuration of a signature generation device 111 according to the second example embodiment of the present invention will be described in detail. FIG. 4 is a block diagram illustrating a configuration of the signature generation device 111 according to the second example embodiment of the present invention.

The signature generation device 111 according to the second example embodiment includes an area selection unit (area selector) 112, a hash calculation unit (hash calculator) 113, a file classification unit (file classifier) 103, a string specification unit (string specifier) 104 and a signature generation unit (signature generator) 105. The signature generation device 111 is communicatively connected to an area information storage unit 210.

The area selection unit 112 selects an area from an input file as a target for calculating a hash value, based on area information stored in the area information storage unit 210 (as will be described later with reference to FIG. 6). The hash calculation unit 113 calculates a hash value for the area selected by the area selection unit 112.

Figure 6:
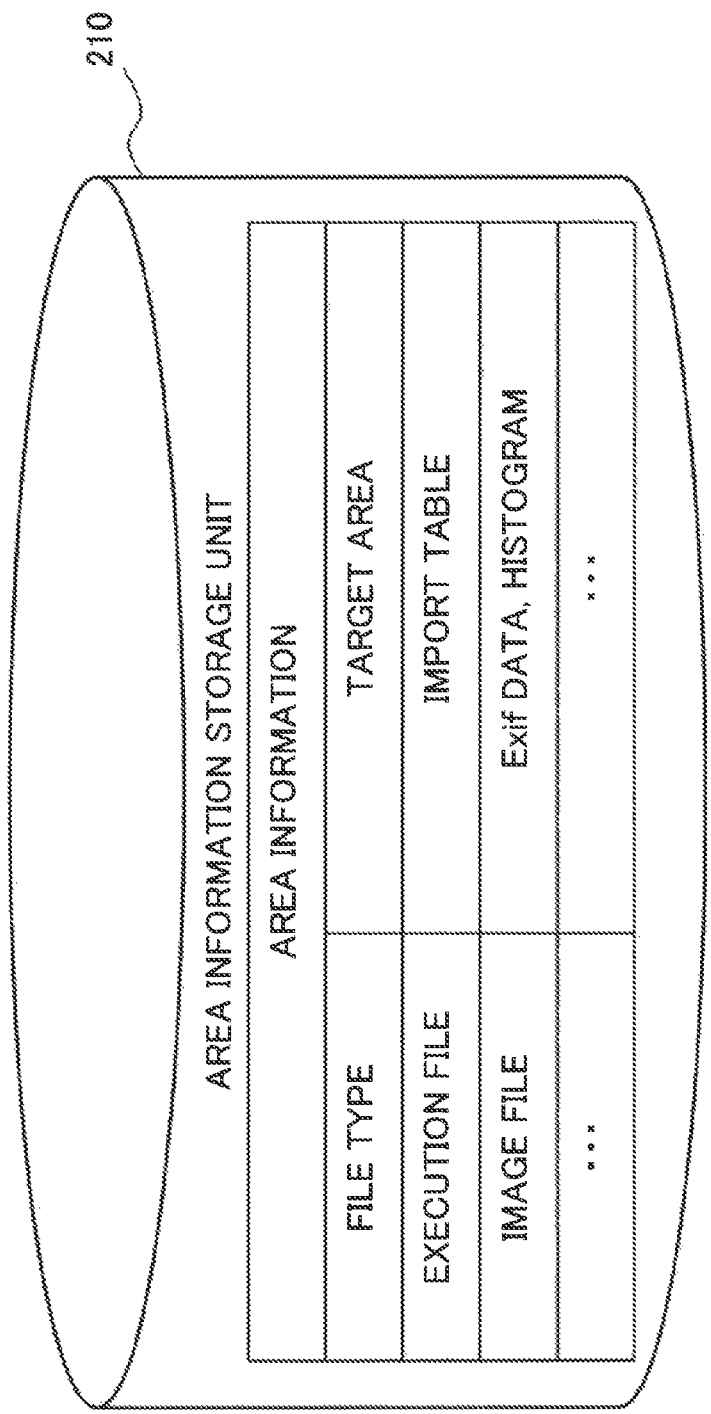
FIG. 6 is a diagram conceptually illustrating an example of area information stored in an area information storage unit.

With reference to FIG. 6, area information will be described. FIG. 6 is a diagram conceptually illustrating an example of area information stored in the area information storage unit 210.

The area information includes information representing an area (hereinafter, referred to as a "target area") for calculating a hash value relating to a file for each file type. In the area information exemplified in FIG. 6, information representing a file type is associated with information representing a target area. In the area information exemplified in FIG. 6, a file type "execution file" is associated with a target area "import table." This indicates that, when a file type of a file is "execution file," a hash value is calculated for an area "import table" in the file. As exemplified in FIG. 6, there may be a plurality of target areas in a file. The area information may include information other than the above-described information without limitation to the above-described example.

Figure 5:
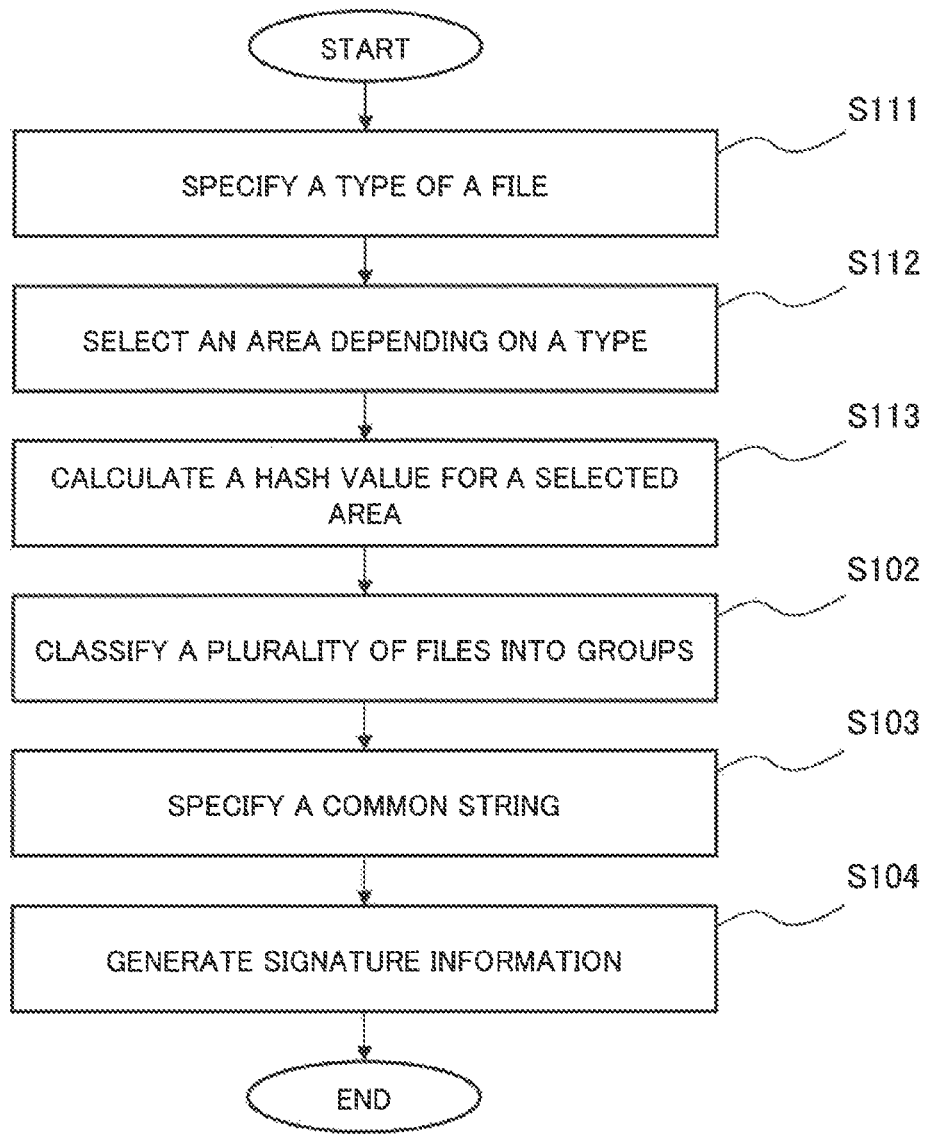
FIG. 5 is a flowchart illustrating a processing flow of the signature generation device according to the second example embodiment.

Next, with reference to FIG. 5, processing of the signature generation device 111 according to the second example embodiment of the present invention will be described in detail. FIG. 5 is a flowchart illustrating a processing flow of the signature generation device 111 according to the second example embodiment.

The area selection unit 112 specifies a file type for each input file (step S111). The file type represents a type of a file, such as an execution file, an image file, and a video file. The file type may be an image file of a file format, such as a JPEG file, a GIF file, and a PNG file. JPEG is an abbreviation of Joint Photographic Experts Group. GIF is an abbreviation of Graphics Interchange Format. PNG is an abbreviation of Portable Network Graphics. The area selection unit 112 may specify the file type of a file, for example, based on an extension of a filename for identifying the file, a symbol string, or the like included in the file. The processing of specifying the type of a file by the area selection unit 112 is not limited to the above-described example.

After step S111, the area selection unit 112 selects a target area for calculating a hash value relating to a file of the specified type, based on area information (exemplified in FIG. 6) (step S112). For example, when the specified file type is an execution file, the area selection unit 112 specifies a target area "import table" associated with a file type "execution file" in the area information (exemplified in FIG. 6).

The hash calculation unit 113 calculates a hash value for data stored in the area selected by the area selection unit 112, in accordance with a predetermined hash calculation procedure (step S113). Thus, the hash value calculated in accordance with the processing indicated in step S113 represents a hash value that is calculated in accordance with a similar procedure for calculating a hash value for a file (calculated at step S101 in FIG. 2).

The hash calculation unit 113 and the area selection unit 112 execute respective processing as indicated in steps S111 to S113 for a plurality of input files.

Thereafter, processing indicated in steps S102 to S104 are executed in the signature generation device 111.

The following will describe an advantageous effect of the signature generation device 111 according to the second example embodiment.

According to the signature generation device 111 of the present example embodiment, highly accurate signature information can be generated within a short period of time. This is for the same reason as described in the first example embodiment.

In addition, the signature generation device 111 according to the second example embodiment can generate more accurate signature information. This is because, since a hash value largely varies depending on an area for calculating the hash value, a group is likely to be generated for each file type and the group is likely to be further classified based on bad-ware. In other words, the signature generation device 111 according to the present example embodiment generates signature information for a group classified based on bad-ware and, thereby, the generated signature information is likely to be generated based on a common string among bad-ware. Thus, since the signature information is likely to be generated for each similar bad-ware, the signature information is likely to represent a character of the bad-ware. As the result, the generated signature information is likely highly accurate signature information.

Third Example Embodiment

The following will describe a third example embodiment of the present invention on the basis of the above-described first example embodiment.

The following description will mainly describe a characteristic configuration according to the present example embodiment. The same components as those of the above-described first example embodiment will be denoted by the same reference numerals to omit redundant descriptions.

Figure 7:
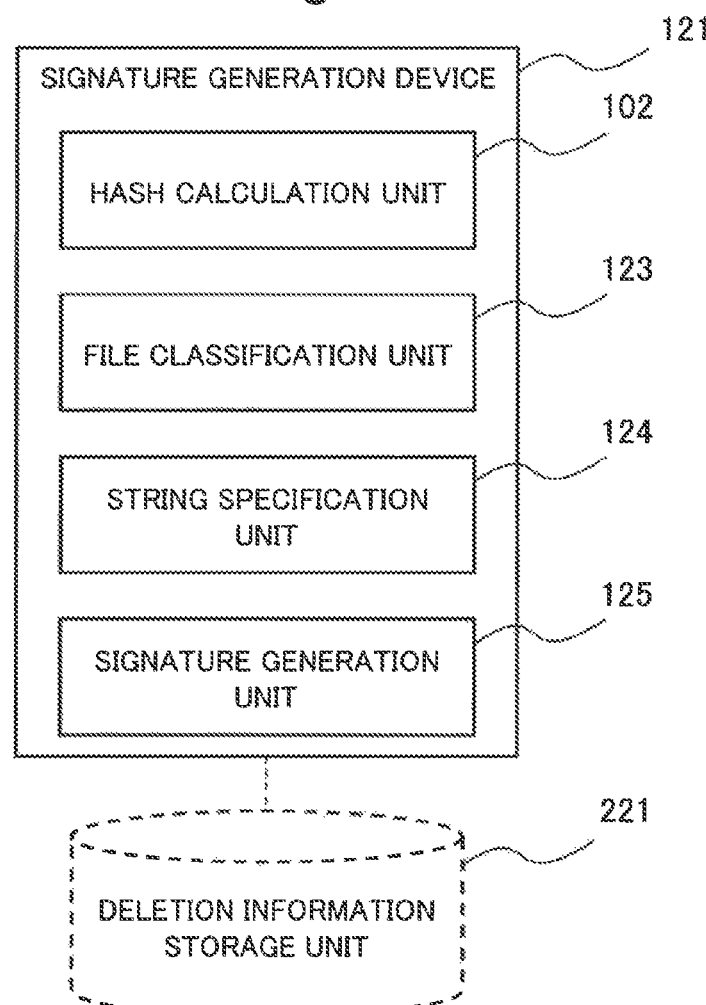
FIG. 7 is a block diagram illustrating a configuration of a signature generation device according to a third example embodiment of the present invention.

With reference to FIG. 7, a configuration of a signature generation device 121 according to the third example embodiment of the present invention will be described in detail. FIG. 7 is a block diagram illustrating the configuration of the signature generation device 121 according to the third example embodiment of the present invention.

The signature generation device 121 according to the third example embodiment includes a hash calculation unit (hash calculator) 102, a file classification unit (file classifier) 123, a string specification unit (string specifier) 124 and a signature generation unit (signature generator) 125. The signature generation device 121 is communicatively connected to a deletion information storage unit 221.

Figure 11:
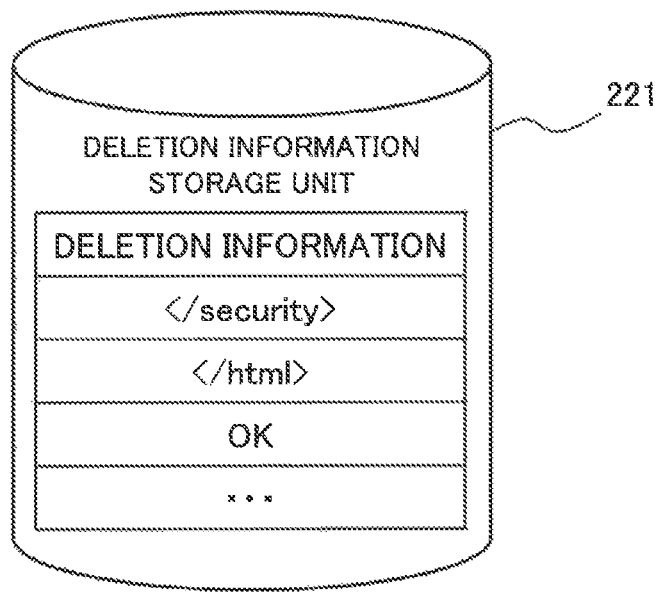
FIG. 11 is a diagram conceptually illustrating an example of deletion information stored in a deletion information storage unit.

The deletion information storage unit 221 stores deletion information that represents strings not specific to bad-ware among signature information generated by the signature generation unit 125 for bad-ware as exemplified in FIG. 11. FIG. 11 is a diagram conceptually illustrating an example of deletion information stored in the deletion information storage unit 221.

As described above, the deletion information includes information that represents strings that are not specific to bad-ware (hereinafter, referred to as "deletion string information"), and may be, for example, information that represents strings that are commonly included in files including no bad-ware. The deletion information exemplified in FIG. 11 includes a string "/security." This indicates that the string "/security" is not a string specific to bad-ware. The deletion information may represent, for example, a string that is included in a single file including no bad-ware without limitation to the above-described example.

Figure 8:
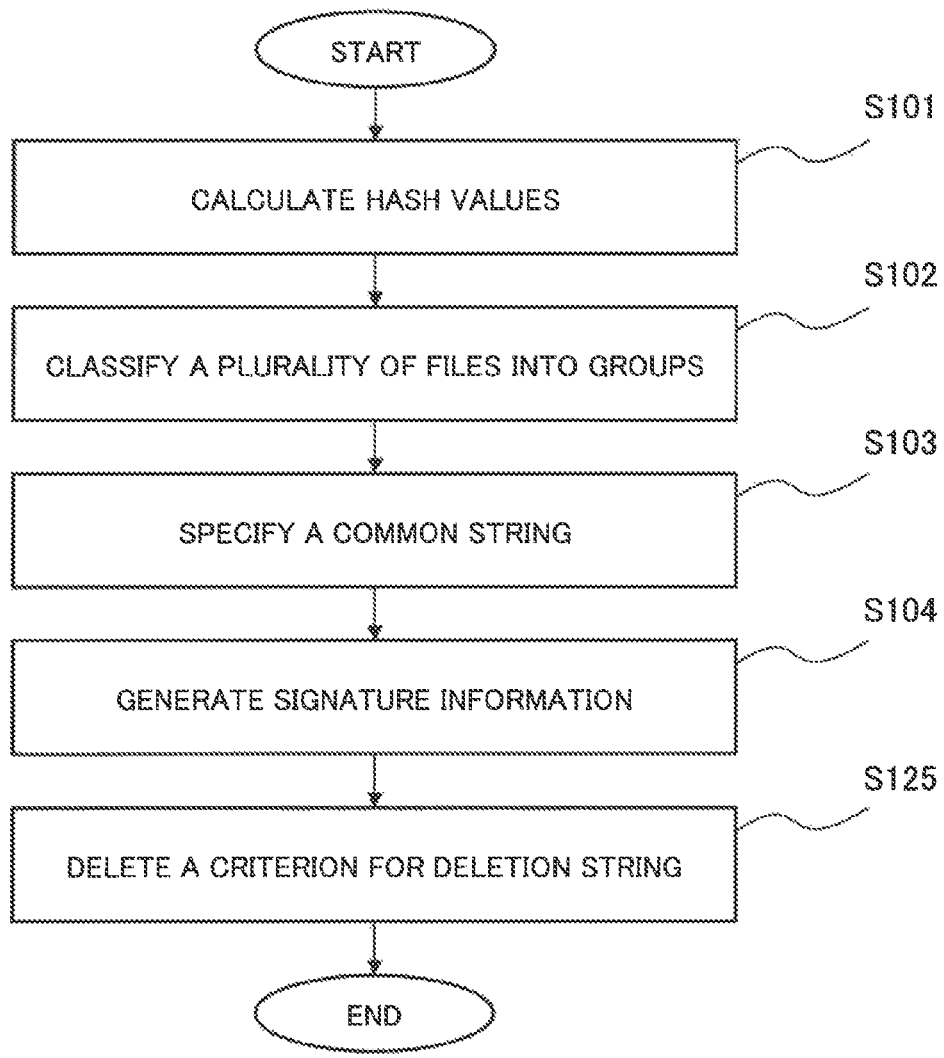
FIG. 8 is a flowchart illustrating a processing flow of the signature generation device according to the third example embodiment.

Next, with reference to FIG. 8, processing of the signature generation device 121 according to the third example embodiment of the present invention will be described in detail. FIG. 8 is a flowchart illustrating a processing flow of the signature generation device 121 according to the third example embodiment.

The signature generation device 121 executes processing similar to the processing that has been described with reference to the flowchart as illustrated in FIG. 2 in the first example embodiment on files including bad-ware and generates signature information for the file (steps S101 to S104).

The signature generation unit 125 deletes a criterion for deletion string information in the deletion information (exemplified in FIG. 11) from the generated signature information. For example, the signature generation unit 125 deletes the deletion string information from the generated signature information by deleting a criterion for the deletion string information and logical operation processing between the criterion and other criterions (step S125).

As described with reference to FIG. 11, since the deletion information represents a string not specific to bad-ware, more accurate signature information can be generated when the signature generation device 121 executes the processing illustrated in FIG. 8.

Figure 9:
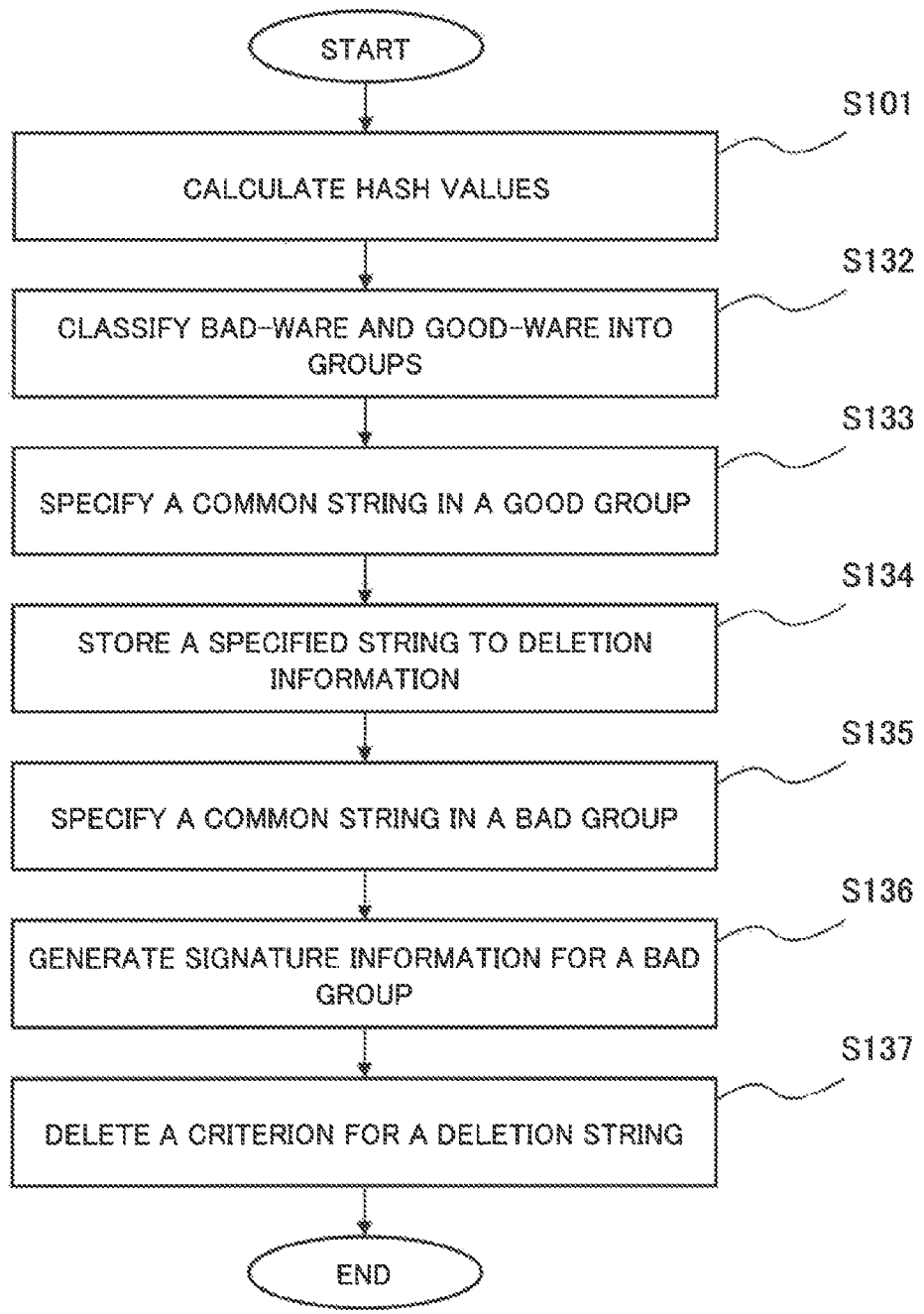
FIG. 9 is a flowchart illustrating a processing flow of the signature generation device 121 according to the third example embodiment.

In accordance with the processing as illustrated in FIG. 9, the signature generation device 121 may classify files including bad-ware and files including no bad-ware into groups, respectively. Then, the signature generation device 121 may execute processing based on the classified groups. FIG. 9 is a flowchart illustrating a processing flow of the signature generation device 121 according to the third example embodiment. In the processing illustrated in FIG. 9, the signature generation device 121 inputs files including bad-ware and files including no bad-ware. For convenience of explanation, it is assumed that the signature generation device 121 inputs a bad file set constituted of one or more files including bad-ware and a good file set constituted of one or more files including no bad-ware.

The hash calculation unit 102 calculates a hash value for a file in accordance with a predetermined hash calculation procedure (step S101).

The file classification unit 123 classifies files included in a bad file set (hereinafter, referred to as "bad files") into a plurality of groups (hereinafter, referred to as "bad groups"), based on similarity of hash values calculated with regard to the files included in the bad file set. Likewise, based on similarity of hash values calculated with regard to the files included in a good file set (hereinafter, referred to as "good files"), the file classification unit 123 classifies good files into a plurality of groups (hereinafter, referred to as "good groups") (step S132).

Next, the string specification unit 124 specifies a string that is commonly included among good files in good groups (step S133), and stores string information that represents the specified string in the deletion information storage unit 221 (step S134). Further, the string specification unit 124 specifies a string that is commonly included among bad files in bad groups (step S135).

Based on the string specified with regard to the files included in the bad groups, the signature generation unit 125 generates signature information relating to the string by executing processing similar to step S104 (FIG. 2) (step S136). The signature generation unit 125 deletes a criterion related to the deletion string information from the signature information by executing processing similar to step S125 (FIG. 8), based on deletion information including information that represents the string specified at step S133 (step S137).

The signature generation device 121 may execute processing in the order from steps S135, S136, S133, to S134 without limitation to the processing order illustrated in FIG. 9.

In the processing illustrated in FIG. 9, since the common string information is string information relating to files included in good groups, the number of files as a target for specifying common string information is smaller compared with that of string information relating to a good file set. Thus, since more varied signature information is specified, the signature generation device 121 can generate signature information with further higher accuracy in addition to the advantageous effect as described with reference to FIG. 8.

Figure 10:
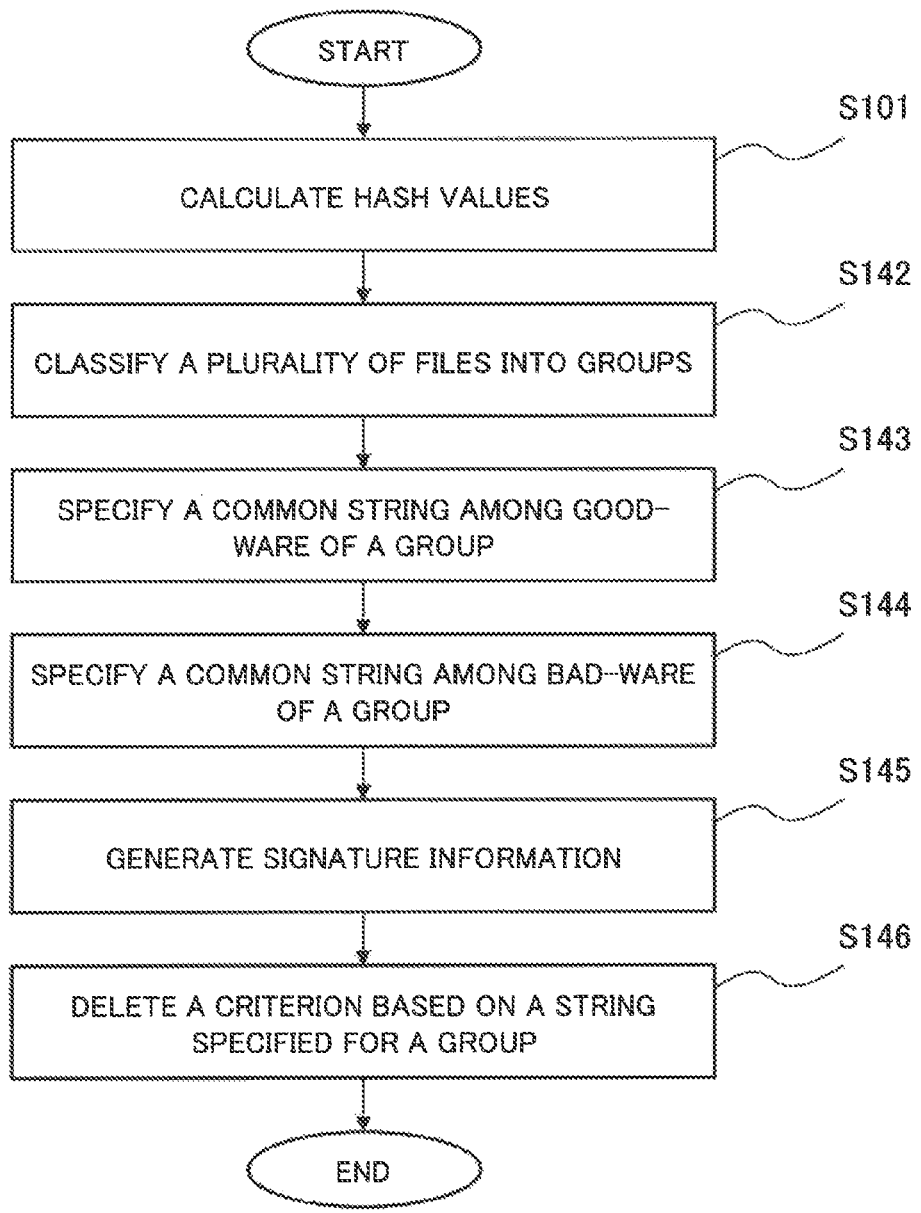
FIG. 10 is a flowchart illustrating a processing flow of the signature generation device according to the third example embodiment.

The signature generation device 121 may classify files into groups, generate signature information for bad-ware included in each group, and update the generated signature information, based on the common string information for good groups included in each group in accordance with the processing illustrated in FIG. 10. FIG. 10 is a flowchart illustrating a processing flow of the signature generation device 121 according to the third example embodiment.

The file classification unit 123 classifies the input plurality of files into groups, based on hash values calculated by the hash calculation unit 102 (step S142).

The string specification unit 124 specifies a string for a good file set included in the classified groups and a string for a bad file set included in each group in accordance with a similar processing procedure as the processing illustrated in steps S133 and S135 (FIG. 9) (steps S143 and S144).

The signature generation unit 125 generates signature information for the bad file set by executing processing similar to step S104 (FIG. 2) (step S145). The signature generation unit 125 deletes a criterion for common string information that is specified with regard to the good file set included in each group from strings included in the generated signature information by executing processing similar to step S125 (FIG. 8) (step S146).

In the processing illustrated in FIG. 10, since common string information as a deletion target from signature information is limited to groups as a source for generating the signature information, the processing of searching a common string as a deletion target is smaller than the processing illustrated in FIG. 9 and the like. Thus, the signature generation device 121 generates signature information in accordance with the processing illustrated in FIG. 10 and, thereby, can generate the signature information within a shorter period of time in addition to the advantageous effect as described with reference to FIG. 9.

The following will describe an advantageous effect of the signature generation device 121 according to the third example embodiment.

The signature generation device 121 according to the third example embodiment can generate highly accurate signature information within a short period of time. This is for the same reason as described in the first example embodiment.

Further, the signature generation device 121 according to the third example embodiment can generate further more accurate signature information or generate signature information within a shorter period of time. This is because the above-described advantageous effect can be obtained based on the reasons as described with reference to the drawings of FIGS. 8 to 10.

Fourth Example Embodiment

The following will describe a fourth example embodiment of the present invention on the basis of the above-described first example embodiment.

The following description will mainly describe a characteristic configuration according to the present example embodiment. The same components as those of the above-described first example embodiment will be denoted by the same reference numerals to omit redundant descriptions.

Figure 12:
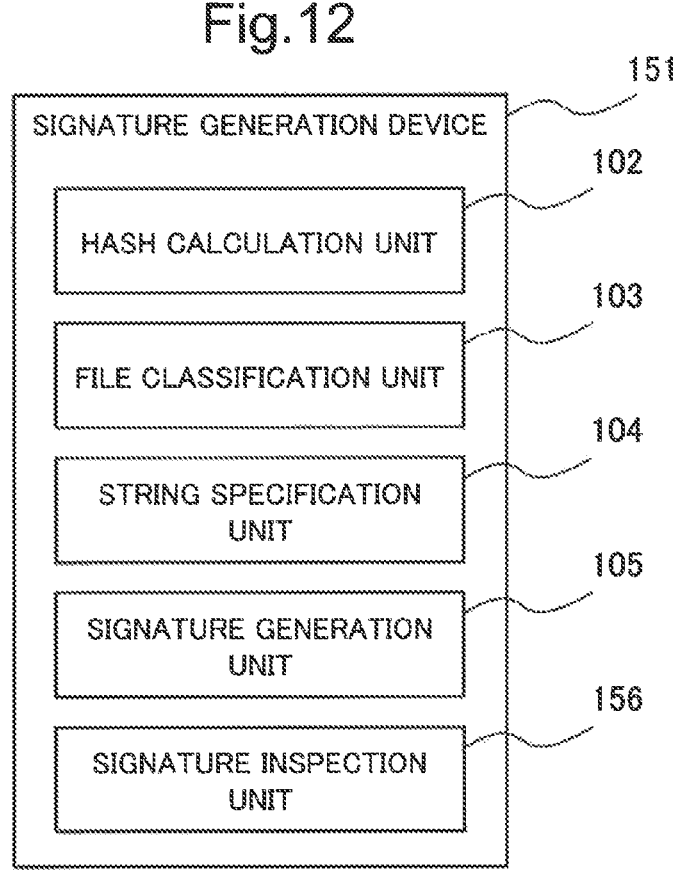
FIG. 12 is a block diagram illustrating a configuration of a signature generation device according to a fourth example embodiment of the present invention.

With reference to FIG. 12, a configuration of a signature generation device 151 according to the fourth example embodiment of the present invention will be described in detail. FIG. 12 is a block diagram illustrating the configuration of the signature generation device 151 according to the fourth example embodiment of the present invention.

The signature generation device 151 according to the fourth example embodiment includes a hash calculation unit (hash calculator) 102, a file classification unit (file classifier) 103, a string specification unit (string specifier) 104, a signature generation unit (signature generator) 105 and a signature inspection unit (signature inspector) 156.

Figure 13:
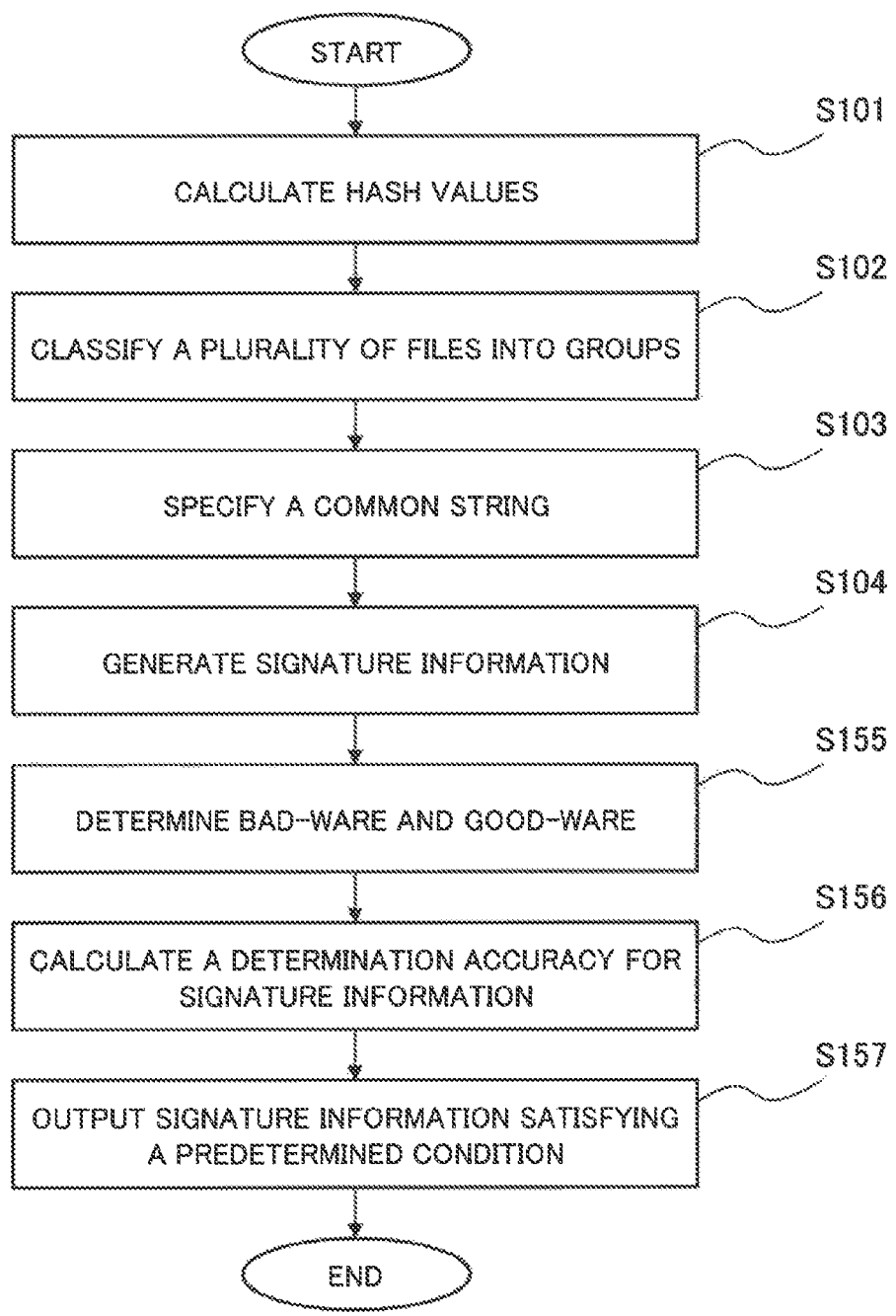
FIG. 13 is a flowchart illustrating a processing flow of a signature generation device according to the fourth example embodiment.

Next, with reference to FIG. 13, processing of the signature generation device 151 according to the fourth example embodiment of the present invention will be described in detail. FIG. 13 is a flowchart illustrating a processing flow of the signature generation device 151 according to the fourth example embodiment.

The units in the signature generation device 151 execute the processing indicated in steps S101 to S104 and, thereby, the signature generation device 151 generates signature information.

The signature inspection unit 156 determines whether or not a file including bad-ware satisfies determination information of signature information and whether or not a file including no bad-ware satisfies the determination information of signature information, based on the signature information generated in step S104 (step S155). As described with reference to FIG. 3, the determination information represents a common string among bad files including bad-ware. Satisfaction of the determination information for a file results in determining that the file includes bad-ware. On the contrary, dissatisfaction of the determination information for a file results in determining that the file includes no bad-ware.

Next, the signature inspection unit 156 calculates accuracy of signature information, based on the determination result for each file (step S156). The signature inspection unit 156 calculates accuracy for files including bad-ware and accuracy for files including no bad-ware.

The signature inspection unit 156 determines whether or not the calculated accuracy satisfies a predetermined condition, and outputs only the signature information satisfying the predetermined condition (step S157). For example, the signature inspection unit 156 may determine whether or not accuracy for files including bad-ware satisfies a predetermined condition. The signature inspection unit 156 may determine whether or not accuracy for files including bad-ware and accuracy for files including no bad-ware satisfy a predetermined condition, respectively. A predetermined determination condition for a file including bad-ware is, for example, a criterion where the accuracy is larger than a predetermined first accuracy. A predetermined determination condition for a file including no bad-ware is, for example, a criterion where the accuracy is not more than a predetermined second accuracy. In such a case, the predetermined first accuracy and the predetermined second accuracy are not necessarily the same values and may be different values.

The signature inspection unit 156 may calculate accuracy for each group as a source for generating signature information, instead of calculating accuracy for each signature information. The signature inspection unit 156 outputs signature information generated based on a group with accuracy satisfying a predetermined determination condition. The signature inspection unit 156 does not output signature information generated based on a group with accuracy dissatisfying the predetermined determination condition. In such a case, when it revealed in a middle of calculating accuracy for a certain group that the accuracy dissatisfies a predetermined determination condition, the signature inspection unit 156 may end the calculation processing of accuracy for the certain group (for example, processing indicated in steps S155 to S157). For example, it is assumed that the number of files is 100 and a predetermined determination condition is that "determination accuracy is higher than 70%". In such a case, the signature inspection unit 156 may end the calculation processing of the accuracy for the group when the number of files that have been erroneously determined for the group reaches 30 or more. In such a case, the signature inspection unit 156 determines that the accuracy for the group does not satisfy the predetermined condition. Thus, in such a case, the signature inspection unit 156 does not output the group. Since the signature inspection unit 156 may not determine whether or not a determination criterion relating to signature information is satisfied for all the files, accuracy for the signature information can be calculated within a short period of time.

The following will describe an advantageous effect of the signature generation device 151 according to the fourth example embodiment.

The signature generation device 151 according to the fourth example embodiment can generate highly accurate signature information within a short period of time. This is for the same reason as described in the first example embodiment.

Further, the signature generation device 151 according to the fourth example embodiment can generate more accurate signature information. This is because the signature generation device 151 calculates accuracy relating to signature information using files, for which information of whether or not the file includes bad-ware has been previously provided, and outputs only signature information with accuracy satisfying a predetermined determination condition. Thus, since the signature generation device 151 does not output signature information with accuracy dissatisfying a predetermined condition, the signature generation device 151 of the fourth example embodiment can generate signature information with even higher determination accuracy.

(Hardware Configuration Example)

A configuration example of hardware resources that achieve a signature generation device or a software determination device according to each example embodiment of the present invention will be described. However, the signature generation device or the software determination device may be achieved using physically or functionally at least two calculation processing devices. Further, the signature generation device may be achieved as a dedicated device.

Figure 14:
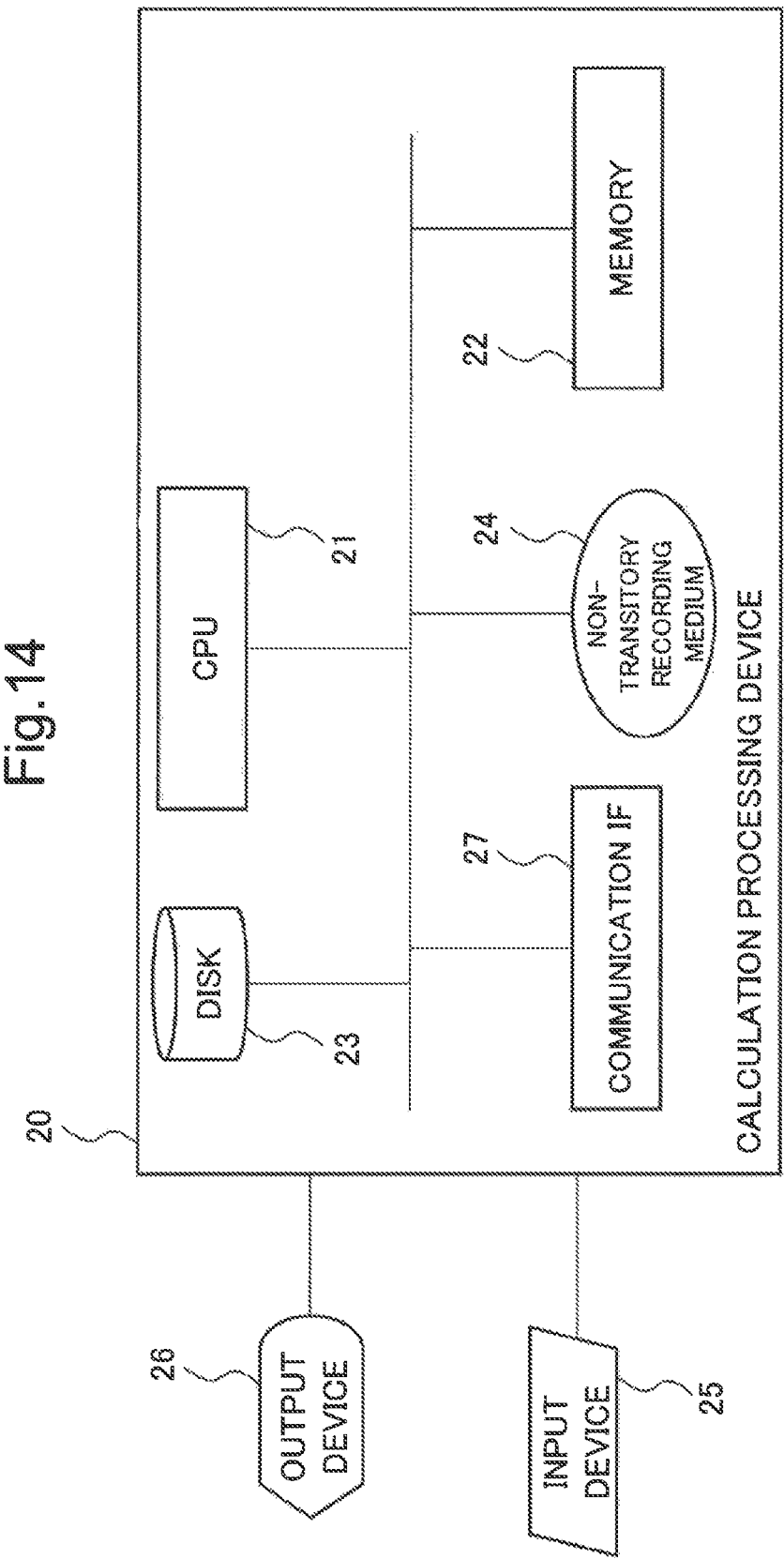
FIG. 14 is a block diagram schematically illustrating a hardware configuration of a calculation processing device capable of achieving a signature generation device or a software determination device according to each example embodiment of the present invention.

FIG. 14 is a block diagram schematically illustrating a hardware configuration of a calculation processing device capable of achieving the signature generation device or the software determination device according to each example embodiment of the present invention. A calculation processing device 20 includes a central processing unit (CPU) 21, a memory 22, a disk 23, a non-transitory recording medium 24, and a communication interface (hereinafter, describes as "communication IF") 27. The calculation processing device 20 may connect an input device 25 and an output device 26. The calculation processing device 20 can execute transmission/reception of information to/from another calculation processing device and a communication device via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored in the disk 23 when executing the program and executes arithmetic processing. The CPU 21 reads data necessary for program execution from the memory 22. When display is needed, the CPU 21 displays an output result on the output device 26. When a program is input from the outside, the CPU 21 reads the program from the input device 25. The CPU 21 interprets and executes a signature generation program (FIG. 2, FIG. 5, FIGS. 8 to 10 or FIG. 13) or a software determination program present on the memory 22 corresponding to a function (processing) indicated by each unit illustrated in FIG. 1, FIG. 4, FIG. 7, or FIG. 12 described above. The CPU 21 sequentially executes the processing described in each example embodiment of the present invention.

In other words, in such a case, it is conceivable that the present invention can also be made using the signature generation program or the software determination program. Further, it is conceivable that the present invention can also be made using a computer-readable, non-transitory recording medium storing the signature generation program or the software determination program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2016-147473, filed on Jul. 27, 2016, the disclosure of which is incorporated herein in its entirety.

REFERENCE SIGNS LIST

101 signature generation device
102 hash calculation unit
103 file classification unit
104 string specification unit
105 signature generation unit
106 software determination system
201 software determination device
111 signature generation device
112 area selection unit
113 hash calculation unit
210 area information storage unit
121 signature generation device
123 file classification unit
124 string specification unit
125 signature generation unit
221 deletion information storage unit
151 signature generation device
156 signature inspection unit
20 calculation processing device
21 CPU
22 memory
23 disk
24 non-transitory recording medium
25 input device
26 output device
27 communication IF

The invention claimed is:

1. A signature generation device comprising:
   at least one memory configured to store one or more instructions; and
   at least one processor configured to execute the one or more instructions to:

calculate hash values for at least a partial area in individual files;
calculate a similarity degree between the calculated hash values and classify the plurality of files into groups based on the calculated degree;
specify common strings among, at least, some of the files in strings included in files of a group, the strings being symbol strings or bit strings;
generate signature information being a criterion for determining whether or not at least a part of a common string in the specified common strings is included in a file; and
execute determination processing for determining whether or not a bad file with bad-ware that adversely affects an information processing device or a good file being a file without the bad-ware satisfies a criterion relating to the signature information, calculate determination accuracy of the signature information generated based on the group, and output only the signature information generated based on the group having the calculated determination accuracy satisfying a predetermined condition, wherein
the determination processing relating to a certain group does not execute when determining that the determination accuracy of the certain group does not satisfy the predetermined condition.

2. The signature generation device according to claim 1, wherein the processor is further configured to:
specify a type of a file and select the area for the specified type based on area information representing a hash value calculation area for a certain type of a file, and calculates a hash value for the specified area.

3. The signature generation device according to claim 1, wherein
the processor is further configured to: delete a criterion relating to deletion string information from the generated signature information in accordance with deletion information, the delete information including the deletion string being a deletion target from the signature information.

4. The signature generation device according to claim 3, wherein
each of the individual files is a bad file with bad-ware that adversely affects an information processing system or a good being a file without the bad-ware, and
the processor is further configured to:
generate a bad group obtained by classifying bad files and a good group obtained by classifying good files,
specify a string common among the files of the bad group and a string common among the files of the good group and stores the string specified for the good group to the deletion information, and
generate the signature information for the bad group obtained by classifying the bad files and deletes a criterion relating to the string in the delete information from the signature information.

5. The signature generation device according to claim 1, wherein
each of the files is a bad file with bad-ware that adversely affects an information processing system or a good file being a file without the bad-ware, and
the processor is further configured to:
specify, respectively, the common string among the files of the group for bad files and good files, and
generate, for the groups, the signature information relating to the common string specified for the bad files and deletes a criterion relating to the common string specified for the good files.

6. The signature generation device according to claim 1, wherein the processor is further configured to:
determine whether or not the bad file with bad-ware that adversely affects a respective information processing device or a respective good file being a respective file without the bad-ware satisfies a respective criterion relating to the generated signature information, calculate a respective determination accuracy of the signature information based on the determined result, and output only the signature information having the calculated determination accuracy satisfying a respective predetermined condition.

7. A software determination system comprising:
a signature generation device according to claim 1,
wherein the processor is further configured to determine whether or not a certain file includes adversely affecting processing in accordance with whether or not a string included in the certain file satisfies determination information included in the generated signature information.

8. A signature generation method performed by an information processing device comprising:
calculating hash values for at least a partial area in individual files;
calculating a similarity degree between the calculated hash values and classifying the plurality of files into groups based on the calculated degree;
specifying common strings among, at least, some of the files in strings included in files of a group, the strings being symbol strings or bit strings;
generating signature information being a criterion for determining whether or not at least a part of a common string in the specified common strings is included in a file; and
executing determination processing for determining whether or not a bad file with bad-ware that adversely affects an information processing device or a good file being a file without the bad-ware satisfies a criterion relating to the signature information, calculate determination accuracy of the signature information generated based on the group, and outputting only the signature information generated based on the group having the calculated determination accuracy satisfying a predetermined condition, wherein
the executing does not execute the determination processing relating to a certain group when determining that the determination accuracy of the certain group does not satisfy the predetermined condition.

9. A non-transitory recording medium storing a signature generation program, the program causing a computer to:
calculate hash values for at least a partial area in individual files;
calculate a similarity degree between the hash values calculated and classify the plurality of files into groups based on the calculated degree;
specify common strings among, at least, some of the files in strings included in files of a group, the strings being symbol strings or bit strings;
generate signature information being a criterion for determining whether or not at least a part of a common string in the specified common strings is included in a file; and execute determination processing for determining whether or not a bad file with bad-ware that adversely affects an information processing device or a good file being a file without the bad-ware satisfies a criterion relating to the signature information, calculate determination accuracy of the signature information generated based on the group, and output only the signature information generated based on the group having the calculated determination accuracy satisfying a predetermined condition, wherein the determination processing relating to a certain group does not execute when determining that the determination accuracy of the certain group does not satisfy the predetermined condition.

* * * * *